(12) United States Patent
Shank

(10) Patent No.: US 6,356,075 B1
(45) Date of Patent: Mar. 12, 2002

(54) POSITION SENSOR SYSTEM INCLUDING VOLTAGE TRANSFER FUNCTION

(75) Inventor: David W. Shank, Big Rapids, MI (US)

(73) Assignee: Nartron Corporation, Big Rapids, MI (US)

( * ) Notice: Subject to any disclaimer, the term of this patent is extended or adjusted under 35 U.S.C. 154(b) by 0 days.

(21) Appl. No.: 08/878,380

(22) Filed: Jun. 18, 1997

Related U.S. Application Data

(63) Continuation-in-part of application No. 08/690,029, filed on Jul. 31, 1996, now Pat. No. 5,642,043, which is a continuation of application No. 08/069,127, filed on May 28, 1993, now abandoned, which is a continuation of application No. 07/296,183, filed on Jan. 11, 1989, now Pat. No. 5,216,364.

(51) Int. Cl.⁷ .......................... G01B 7/14; B60G 11/28
(52) U.S. Cl. ..................... 324/207.24; 324/207.12; 324/226; 280/5.501; 280/6.157
(58) Field of Search ............... 324/207.24, 207.12, 324/207.15, 207.16, 207.17, 207.22, 225, 226; 702/85, 86, 104; 280/5.5, 5.501, 5.514, 6.15, 6.157; 180/41

(56) References Cited

U.S. PATENT DOCUMENTS

| | | | |
|---|---|---|---|
| 2,911,632 A | * 11/1959 | Levine et al. | .......... 324/207.24 |
| 3,020,527 A | 2/1962 | MacLaren | |
| 3,891,918 A | 6/1975 | Ellis | |
| 4,064,396 A | * 12/1977 | Panarello | ..................... 902/86 |
| 4,358,762 A | 11/1982 | Wolf et al. | |
| 4,408,159 A | 10/1983 | Prox | |
| 4,555,120 A | 11/1985 | Frait et al. | |
| 4,742,794 A | 5/1988 | Hagstrom | |
| 4,839,590 A | 6/1989 | Koski et al. | |
| 4,873,655 A | * 10/1989 | Kondraske | ............. 324/207.12 |
| 4,909,536 A | * 3/1990 | Hale | ........................... 280/707 |
| 4,912,397 A | * 3/1990 | Gale et al. | ..................... 702/86 |
| 4,914,610 A | * 4/1990 | Shimizu et al. | ................ 702/97 |
| 5,017,867 A | 5/1991 | Dumais et al. | |
| 5,031,934 A | * 7/1991 | Soltis | ......................... 280/840 |
| 5,045,785 A | 9/1991 | Hansen | |
| 5,322,321 A | * 6/1994 | Yopp | .......................... 280/707 |

FOREIGN PATENT DOCUMENTS

SU      1232-931 A      12/1984

OTHER PUBLICATIONS

Automotive Electronics Handbook, 1994, pp. 17.6, 17.7, 17.8.
Automotive Handbook (3rd Edition) pp. 560–563.
1994 Cadillac Northstar Series.
Automotive News (Sep. 7, 1992).
Automotive Newsfront, Feb. 1992.
Automotive Industries, Feb. 1992.

* cited by examiner

*Primary Examiner*—Walter E. Snow
(74) *Attorney, Agent, or Firm*—Watts, Hoffmann, Fisher & Heinke Co., L.P.A.

(57) ABSTRACT

A position sensing device including two spaced conductive coils constituting a primary and secondary winding of a transformer. A coupling member is mounted to a moveable object. This movement adjusts or alters the transformer coupling between the primary and the secondary and produces a variable output signal which can be correlated to the position of the moveable member. An electronic module is coupled to a programmable controller and adjusts an output from the linear position sensor to linearize the output with relative movement of first and second members such as components of a vehicle shock absorber.

11 Claims, 14 Drawing Sheets

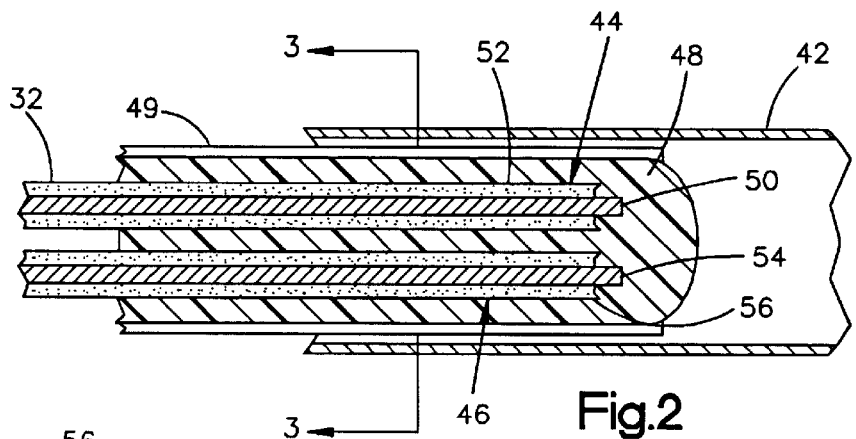
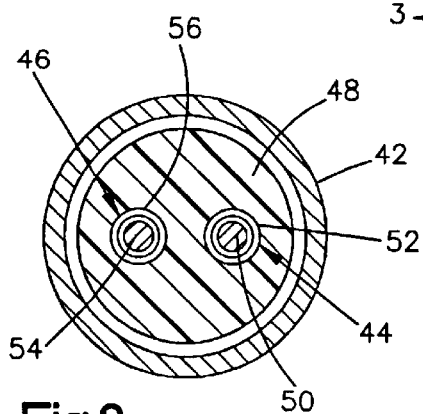
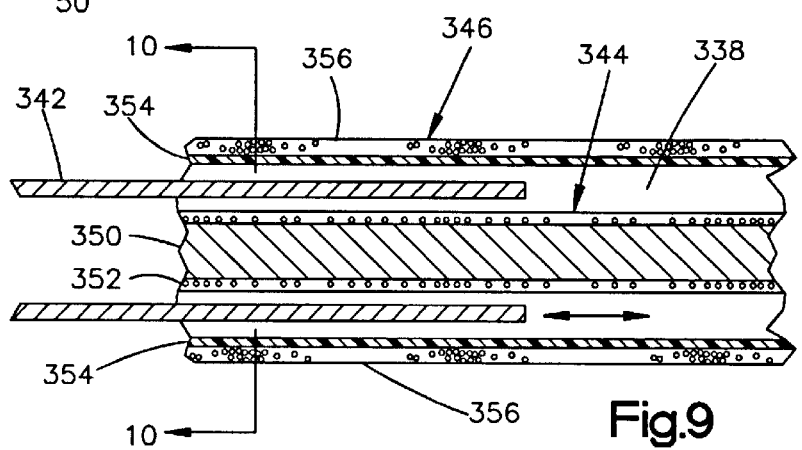
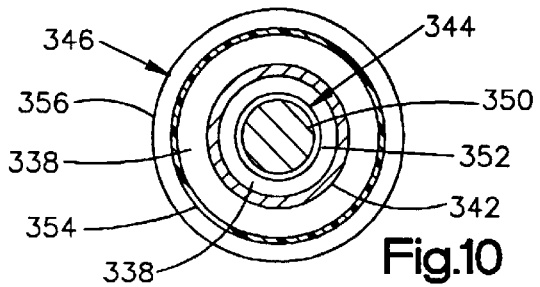

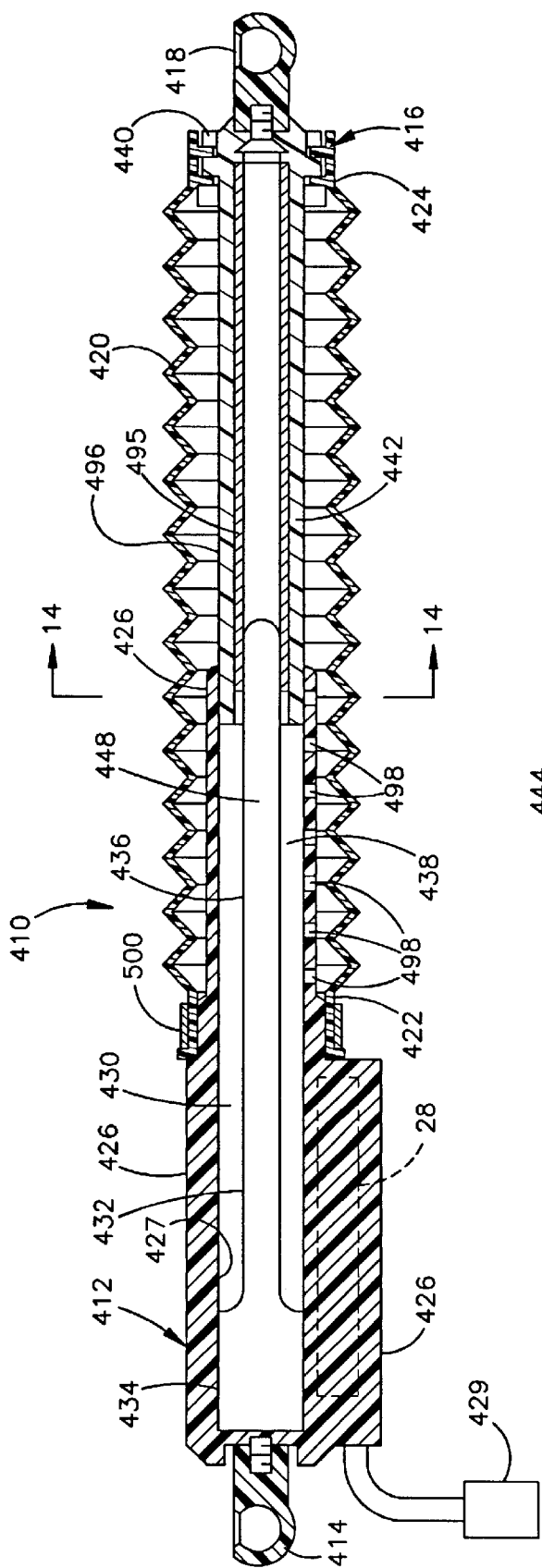
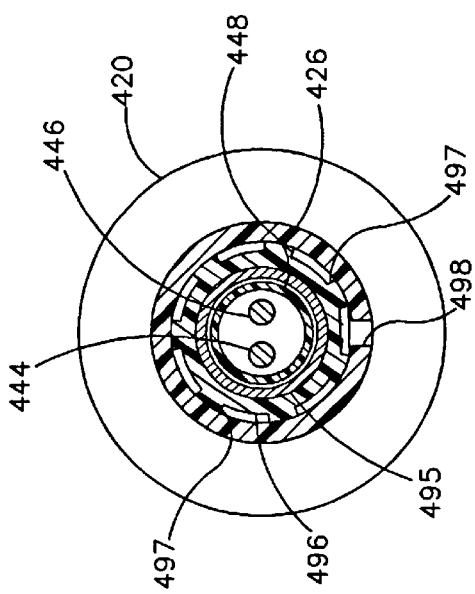
Fig.13
Fig.14

US 6,356,075 B1

POSITION SENSOR SYSTEM INCLUDING VOLTAGE TRANSFER FUNCTION

CROSS REFERENCE TO RELATED APPLICATIONS

The present patent application is a continuation-in-part of patent application Ser. No. 08/690,029, Filed Jul. 31, 1998, now U.S. Pat. No. 5,642,043, which is a continuation of Ser. No. 08/069,127 filed May 28, 1993, now abandoned, which is a continuation of application Ser. No. 07/296,183 Filed Jan. 11, 1989, now U.S. Pat. No. 5,216,364 to Ko et al. which is incorporated herein by reference.

FIELD OF THE INVENTION

The present invention concerns a sensor that provides a signal that varies with motion (translation or rotation) according to a function such as a voltage transfer function. More specifically, the invention relates to a linear position sensor and a control for such linear position sensor.

BACKGROUND ART

The present invention concerns position sensors for use with a motor vehicle. Due to the highly competitive nature of the business of supplying components to the automotive industry, any vehicle based sensor must by reliable, accurate and cost competitive.

A number of prior art patents relate to position sensors. U.S. Pat. No. 3,020,527 to MacLaren concerns a position indicating system and more particularly concerns a telemetric system for indication the position of a remote or inaccessible means which may be moved to various positions in a simple, convenient, accurate, and reliable manner.

U.S. Pat. No. 4,555,120 to Frait et al concerns a position sensor which can be utilized as a height sensor in an automatic vehicle suspension system. The structure disclosed in the '120 patent to Frait et al is principally concerned with the sensor structure.

SUMMARY OF THE INVENTION

Position sensing apparatus constructed in accordance with the present invention includes an elongated field producing member having an input for energizing the field producing member to produce an electromagnetic field in the vicinity of the field producing member. An elongated field responsive member oriented generally parallel to the field producing member along a length of the field producing member provides an output signal in response to the electromagnetic field produced by the field producing member. A coupling member supported for relative movement with respect to one of the elongated field producing or field responsive members alters a response of the field responsive member as the coupling member moves. This altering changes the signal at the output of the field responsive member.

A monitoring circuit coupled to the output from the field responsive member correlates changes in the output signal with relative movement of the coupling member. The monitoring circuit includes a memory for modifying the output signal from the field responsive member to provide a position signal having a controlled relation to relative movement of the coupling member.

In accordance with a preferred embodiment of the invention the controlled relation is a linear relation so that the modified output from the monitoring circuit is directly proportion of the position of the coupling member.

The monitoring circuit is most preferably a programmable controller having a control program for gathering data from an output from the field responsive member. The modification of the output signal from the field responsive member is most preferably accomplished with an electronically erasable read only memory circuit. This circuit selectively adds or subtracts a value to the output from the field responsive member based upon the value of that output.

The preferred use of the position sensor is in a ride control system for use with a motor vehicle. The ride control system is most preferably implemented with a pressure adjusted height adjusting means such as pressurized shock absorbers. The pressurized shock absorbers are coupled to a pressure source and a valving control to control the extension or height of the vehicle.

A further feature of the invention is the use of a pressure sensor to determine pressure in the shock absorber and correlate the pressure and shock absorber extension to determine a failure of the shock absorber. A further feature is adjustment of the ride level of the motor vehicle based upon sensed pressure and position of the shock absorber. If a certain pressure is required to maintain a specified spacing between shock absorber components, it may be assumed the load is high and therefore the handling characteristics of the vehicle may be improved by lowering the center of gravity. Use of a programmable controller allows the use of control programs to achieve control over vehicle ride that can be readily updated by reprogramming the controller.

The above and other objects advantages and features of the invention will be better understood from the following detailed description of a preferred embodiment of the invention which is described in conjunction with the accompanying drawings.

BRIEF DESCRIPTION OF THE DRAWINGS

FIG. 2 is an enlarged partial view of the area indicated at II in FIG. 1;

FIG. 3 is a sectional view taken along the lines III—III in FIG. 2;

FIG. 9 is an enlarged view of the area designated IX in FIG. 8;

FIG. 10 is a sectional view taken along the lines X—X in FIG. 9;

FIG. 13 is a sectional side view of a third embodiment of the invention;

FIG. 14 is an enlarged sectional view taken along the lines XIV—XIV in FIG. 13;

BEST MODE FOR PRACTICING THE PREFERRED EMBODIMENT

Figure 1:
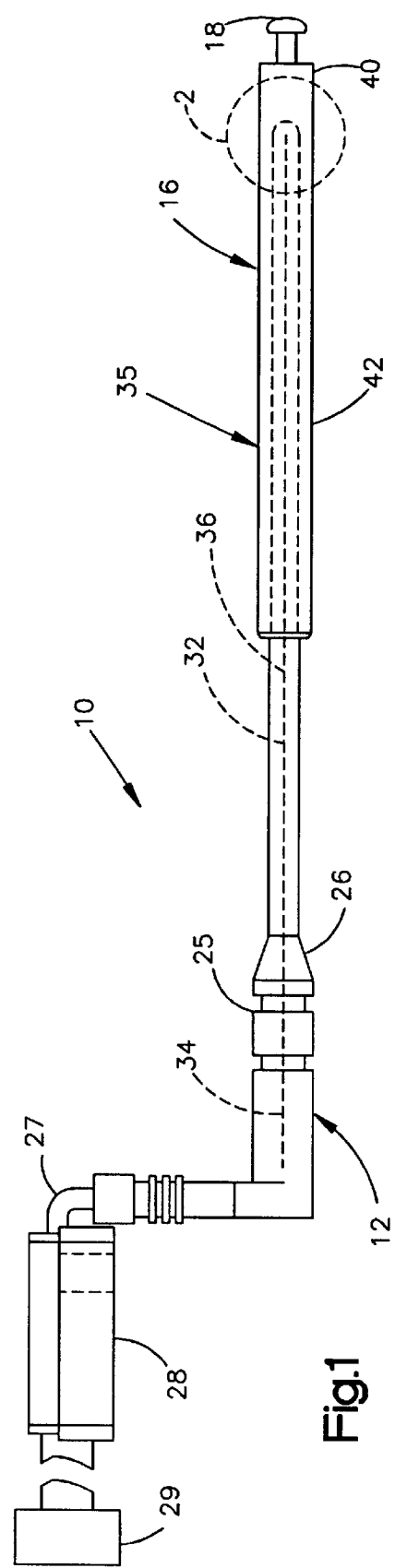
FIG. 1 is a sectional side view of a non-contact linear position sensor according to one embodiment of the invention.
Figure 1A:
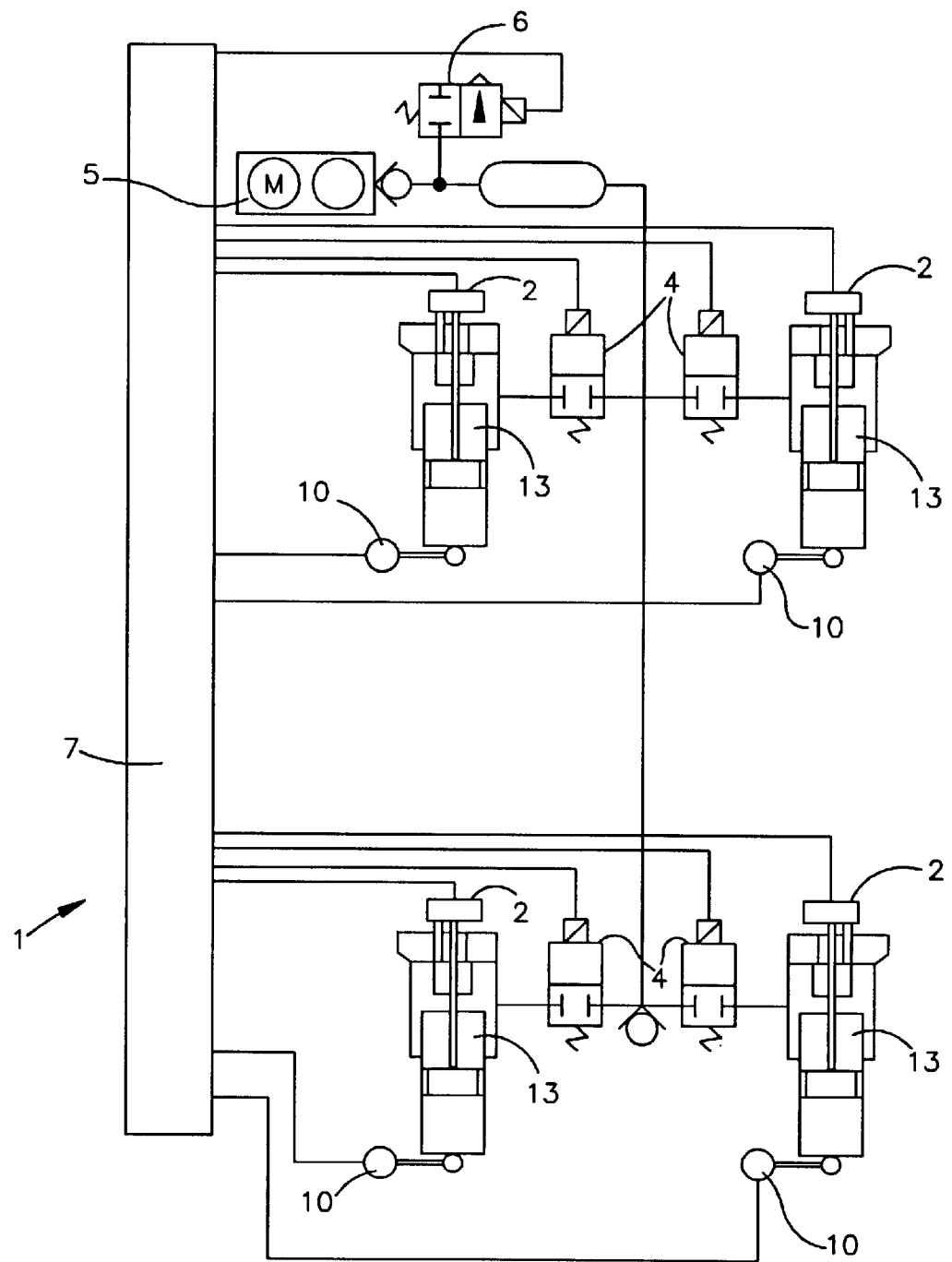
FIG. 1A is a schematic overview of a ride control system constructed in accordance with the present invention.

A pneumatic or hydraulic ride/height control system 1 for use with a linear position sensor 10 such as the linear position sensor of FIG. 1 is schematically depicted in FIG. 1A. The linear position sensor 10 is located at each wheel of the motor vehicle as is a pressure sensor 2 for sensing a pressure and generating sensed signals for use by the control system 1.

One object of the invention is the combination of the linear position sensor 10 and the control system 1 to determine the ride height of a vehicle that provides the safest, most stable vehicle operating conditions. This would be accomplished by raising or lowering a vehicle by pneumatic or hydraulic ride/height adjustment methods (shock absorbers 13, air bladders, etc.)

A vehicle's center of gravity is lowered when it is brought closer to the ground. Therefore, when a vehicle is loaded, its center of gravity may be lowered by reducing the vehicle height and thereby increasing vehicle stability. The linear position sensor 10 incorporates features that could directly control a compressor 5, exhaust valve 6 and four height control valves 4 that control the height of a vehicle. Further sensing capabilities such as use of a pressure sensor 2 allow practice of an adaptive ride and height control for lowering the center of gravity of the vehicle with attendant improved vehicle stability and safety.

Adaptive Ride Height/Control

The combined sensor/control system adapts to road conditions, load, grade of the road surface and vehicle pitch and yaw. Under rough road conditions it reduces the vehicle height lower than when under a normal load to achieve higher handling stability. If the output from the linear position height sensors 10 is highly modulated, indicating a dynamic road surface, a controller 7 makes a determination to reduce the vehicle height to achieve the desired stability.

In accordance with a preferred embodiment of the invention the controller 7 also monitors vehicle speed and turning conditions. A steering sensor (not shown) determines angular position and conveys the required information to the ride height controller 7. The steering sensor can provide degrees of turning to the controller 7 and from this, the controller 7 derives the rate of change that the vehicle is undergoing. The controller 7 then adapts to speed signals from a speed sensor and changes the height accordingly using not only speed and steering angle, but also calculated rate of change of speed and steering angle.

The ability to change vehicle height based on the mentioned conditions can also be used in conjunction with varying load characteristics. If a vehicle is carrying a heavy load, it would be, as previously mentioned, desirable to lower the center of gravity to provide improved stability and handling.

The control then would determine the optimum ride height based on road conditions, load, speed, steering angle, and rate of change of speed and steering angle.

Diagnostics

Diagnostic information from the control system of FIG. 1A is available in the form of ride height versus pressure information. This information can conform to a predefined or adaptive performance criteria stored in an EEPROM of the controller 7 include the capacity to control ride dampening in response to changing loading, speed, road conditions. The system has the ability to check for a change in height vs. pressure, check for a deviation from known performance characteristics and provides for broken vehicle shock or spring detection.

A vehicle's suspension system can be characterized or quantified in terms of vehicle height vs. load. The sensor 10 and controller 7 can be developed such that these characteristic parametrics are embedded into a control algorithm maintained within the controller's memory. With the suspension system in the nominal state the controller will function normally as described above. If the vehicle moves outside of the predetermined operating ranges, a warning indication may be presented to the operator.

As an example, at a given load (measured by the pressure sensor 2) the vehicle should be a specific height. If the vehicle is too low for a given load, the controller would indicate that there is a suspension problem. The problem could be a broken spring or shock, the shocks are worn and need to be replaced, or a leak in hydraulics or pneumatics (all dependent on the type of suspension system the vehicle has).

Vehicle Engine Control Based On Load

The disclosed control system has the ability to modify air/fuel ratio based on load, speed, road condition and will modify the torque curve to adapt to changes in load, speed, road condition.

Linear Position Sensor

Figure 15:
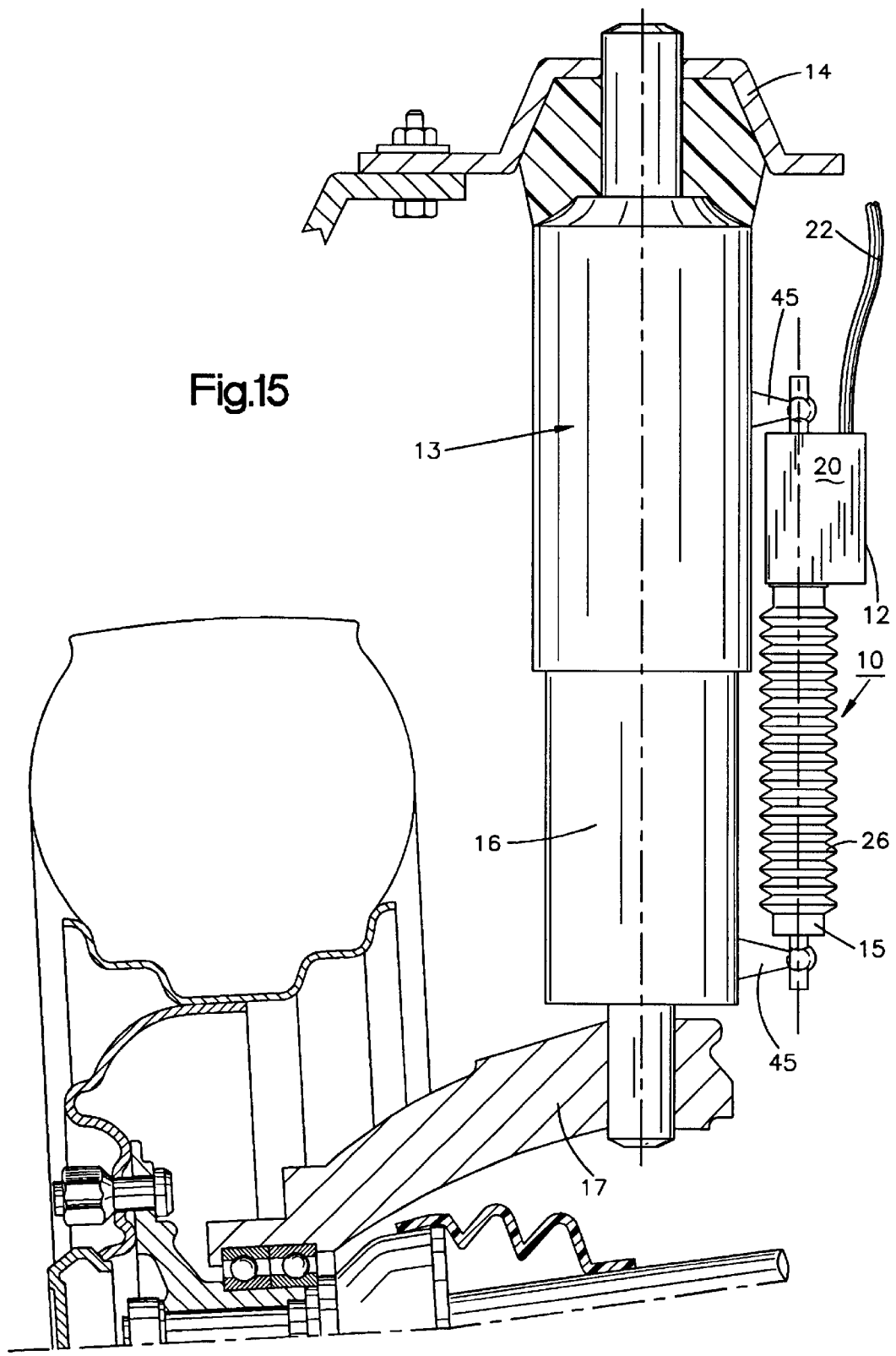
FIG. 15 is a schematic depiction of a vehicle suspension.

Referring now to FIGS. 1,13, and 15 and the illustrative embodiments depicted therein, a non-contact position sensor 10 includes a base portion 16 attached to one portion of a vehicle, such as the portion of a shock absorber 13 attached to the vehicle chassis 14, and a tracking portion 16 which is attached to a portion of the vehicle whose position it is desired to sense, such as the portion 16 of the shock absorber attached to a wheel support assembly 17 (FIG. 15). The base and tracking portions 12, 16 are relatively longitudinally movable with respect to each other and are external to the shock absorber 13.

The position sensor 10 further includes a housing 20 that supports circuitry 28 (FIG. 5) for generating position indicating signals and transmitting those signals via a cable 22 to a vehicle ride control computer. In a preferred design an electrical connector 23 (FIG. 2) attached to the cable 22 is adapted to engage a mating connector (not shown) for connection to a ride control controller 7 and provides input and output interconnection for the position sensor 10.

A flexible cylindrical bellows 26 is coupled at one end to the base portion and at an opposite end to the tracking portion of the sensor 10 and defines an internal chamber 26a. A winding assembly 32 extends from the base portion 12 into a region surrounded by the tracking portion. The winding assembly 32 includes a proximal end portion 34 fixed to the sensor base portion 12 and a distal sensing portion 36 positioned within the tracking portion 16.

The tracking portion 16 includes a support 40 for a transformer coupling member that includes an elongated tubular conductor 42. The tubular conductor 42 has an inner diameter selected to freely slide over an outer diameter of the winding assembly 32. The support 40 includes a fitting 42a for attachment of the tracking portion 15 of the sensor to a mounting stud 45 of the shock absorber. A similarly constructed fitting 42b at the base portion 12 of the sensor 10 allows the sensor 10 to be attached to a second mounting stud 45 attached to the shock absorber.

The sensing element or winding assembly 32, includes a primary winding 44 and a secondary winding 46 that are mutually encapsulated within encapsulating material 48 (FIGS. 2 and 3). The primary and secondary windings 44, 46 are coextensive or side-by-side, for substantially their entire length which spans the winding assembly 32 and are generally mutually parallel and spaced apart. The primary winding 44 includes an elongated cylindrical core 50 and a coil 52 defined by a single magnet wire spirally wound around the core 50 over substantially the entire length of the core. The secondary winding 46 includes an elongated cylindrical core 54 having a coil 56 defined by a single magnetic wire radially wound around core 54 over substantially its entire length. In one preferred embodiment, the cores 50, 54 are 0.05 inch diameter ferromagnetic rods such as alloy 51 from Carpenter technology corp. and are 7.2 inches in length. The coils 52, 56 include a double layer of 39 AWG wire, compactly wound on the associated insulated core which produces an inductance of 3 to 4 millihenries for each coil. Primary and secondary winding 44, 46 are mutually encapsulated by a material 48 which is encased withint a plastic sleeve 49, and in the illustrated embodiment, is a soft compound such as DOW corning 4442.

The proximal end 34 of the winding assembly 32 for includes a plastic carrier that carries metal terminals for routing energization signals to the primary winding 44 and output signals from the secondary winding 46. The carrier is constructed from plastic (preferably 30% glass reinforced polyester) and is molded to form right and left carrier halves. Each half defines an opening into which the cylindrical cores 50, 54 are pressfit.

The wire coils 52, 56 are then wound around the cores 50, 54 and attached to their respective terminals. The two halves of the carrier are then attached together and the cores 50, 54 are suspended in the suspension material 48. To suspend the windings 44, 46 the cylindrical sheath is filled with the suspension material by pouring the material into an inner cavity of the sheath. An end cap or plug is pressed into a distal end of the sheath. The completed winding assembly 32 is then pushed into the base portion 12 of the sensor until the carrier seats within a cavity in the base portion 12. A plastic cover that includes the fitting is then connected to the base portion 12 to fix the winding assembly 32 in place. The carrier is depicted in U.S. Pat. No. 5,210,490 to Munch et al. which is incorporated herein by reference.

The bellows 26 engages similarly configured circular slots or grooves 57, 59 defined by the base and tracking portions 12, 16 respectively and inhibits dirt and the like from entering the sliding interface between the support 40 and the base portion 12. During installation the tracking portion 15 is attached to the shock absorber via the fitting and stud connection. The bellows 26 is attached to the tracking portion 15 and the base portion so the winding assembly 32 fits within the conductor 42. The base portion 12 is then attached to the stud 45 via the fitting and the bellows attached to the base portion by pushing the bellows over the base portion 12 until ridges of the bellows seat in the grooves 57.

When the sensor 10 is installed the tubular portion 42 of the tracking portion 16 surrounds a varying length of the coextensive, spaced, parallel primary and secondary windings 44, 46 and provides a transformer coupling adjustment member for the windings, which are configured as a transformer. In the embodiment illustrated in FIGS. 1–3, the tubular portion 42 is a transformer coupling enhancing member which increases the transformer coupling between the primary and secondary windings as the sensing portion 36 and tubular portion 42 become more telescopingly coextensive, as a result of movement of the vehicle wheel assembly closer to the vehicle frame.

In the illustrated embodiment, the tubular member 42 is a nonferrous metal, such as aluminum, which enhances transformer coupling between the primary and secondary windings through a radially looping current that is developed in the tubular portion as a result of excitation of the primary winding.

Figure 4:
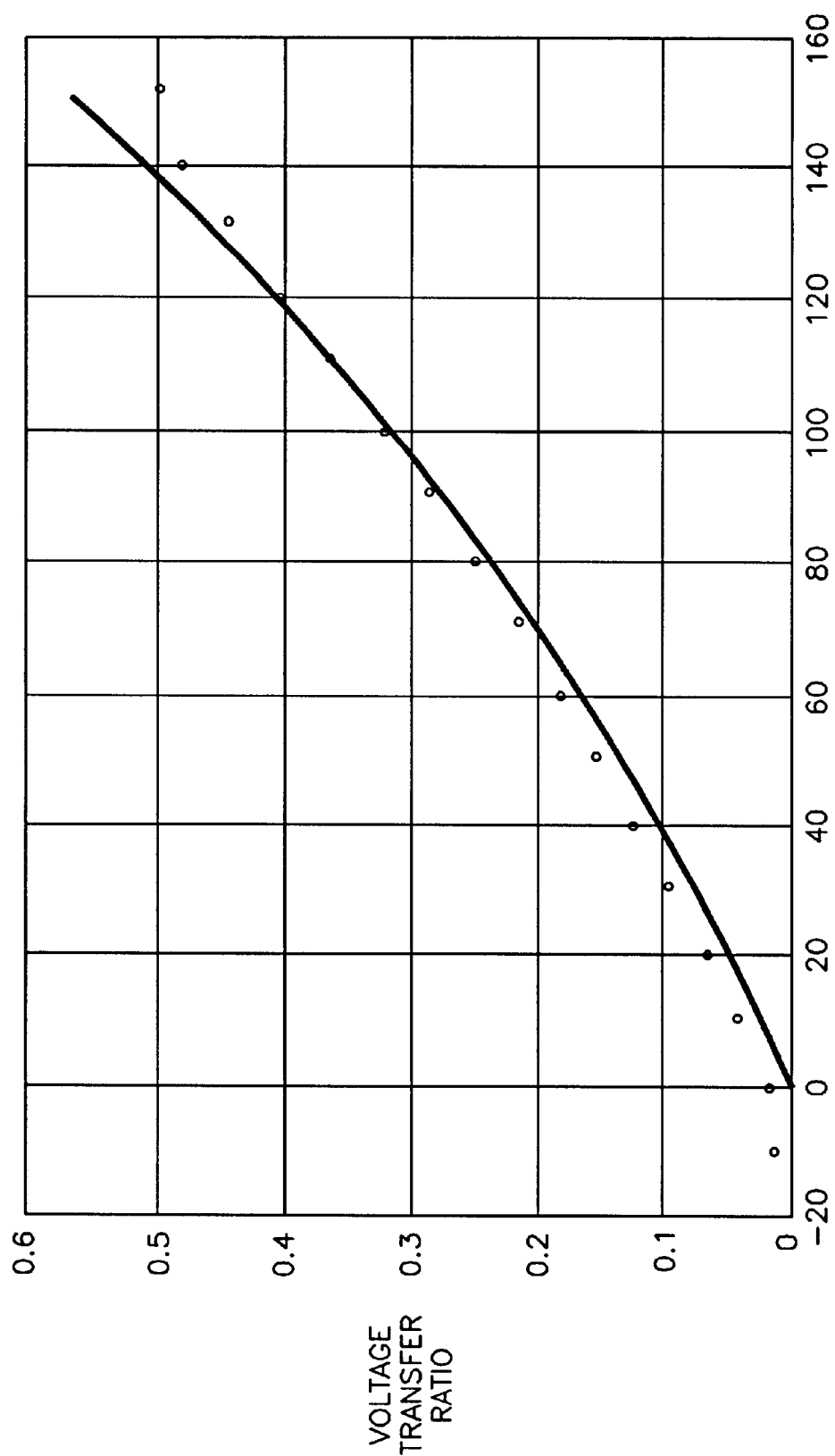
FIG. 4 is a graphic diagram of the voltage transfer ratio as it relates to the relative position of portions of a sensor probe according to the embodiment in FIG. 1.

Sample results obtained from uniformly wound primary and secondary coils are illustrated in FIG. 4. By reference to this figure, it is seen that the signal developed across the secondary winding, which is directly proportional to the voltage transfer ratio, is substantially linearly related to the amount of overlap of the tubular conductor 42 with respect to the sensing or distal portion of the winding assembly 32.

It may be desired to provide a particular characteristic nonlinear voltage transfer ratio for a particular application. The turn density may be arranged in order to "tune" the voltage transfer ratio to the desired characteristic.

In an alternate embodiment of the winding assembly (FIGS. 5 and 6) the suspension material is eliminated and the shell material 48 is extended to secure and provide structural stability to the winding assembly.

The FIG. 2 embodiment has cores 50 and 54 that are .05-inch diameter ferromagnetic rods insulated with a .002-inch Teflon coating or other insulating material and are 7.2 inches in length. Coils 52 and 56 include a double layer of 41-AWG and 43-AWG wire, respectively, compactly wound on the associated insulated core which produces an inductance of 3 to 4 milihenries for each coil. Primary and secondary windings 44 and 46 are each covered by a protective film such as a Mylar sleeve (not shown), and are mutually encapsulated by an appropriate material 48 which, in the illustrated embodiment is a liquid crystal polymer, such as Celanese Corporation Vectra B-130.

Figure 6:
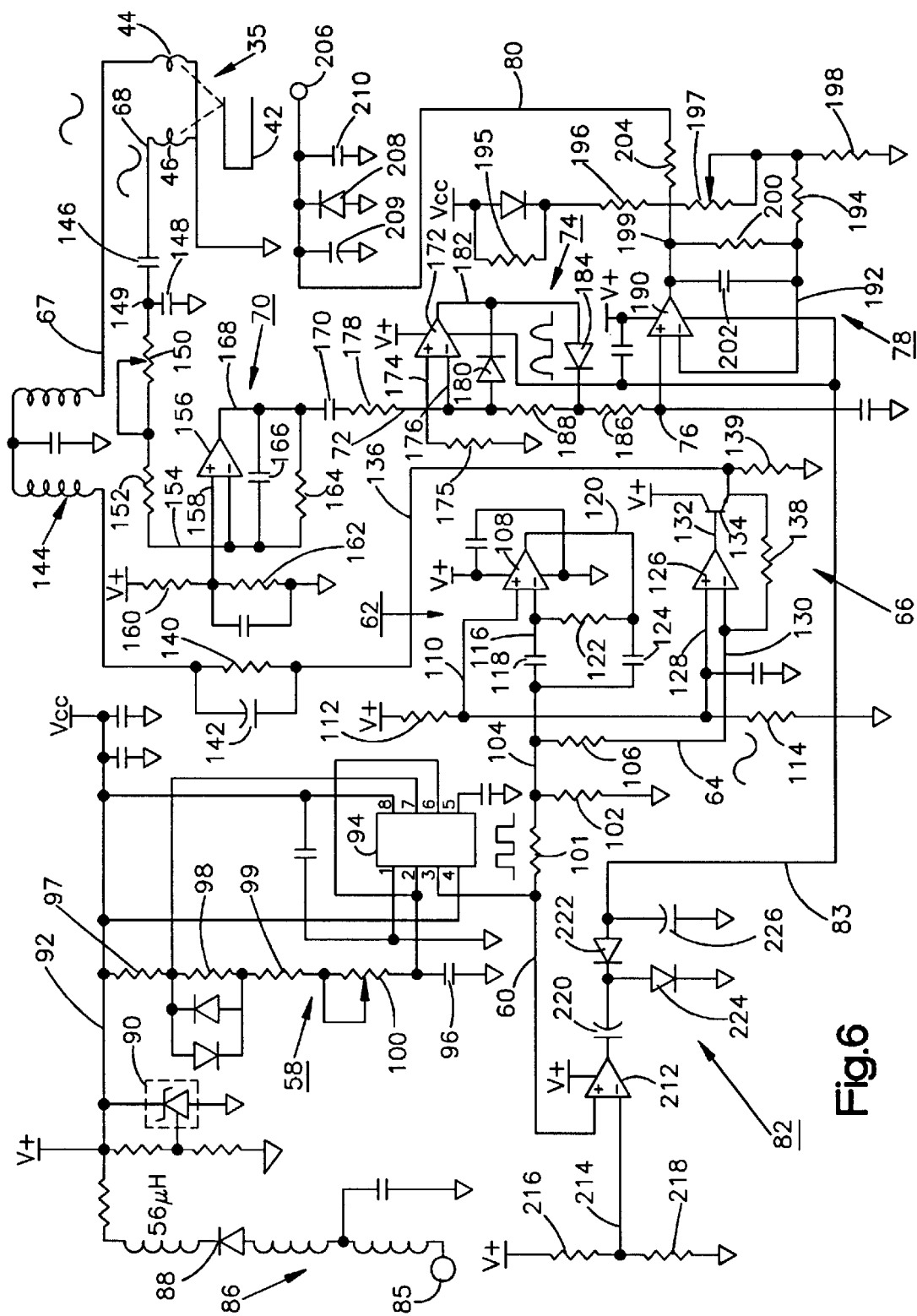
FIG. 6 is an electrical circuit diagram in schematic form of the control circuit in FIG. 5.
Figure 7:
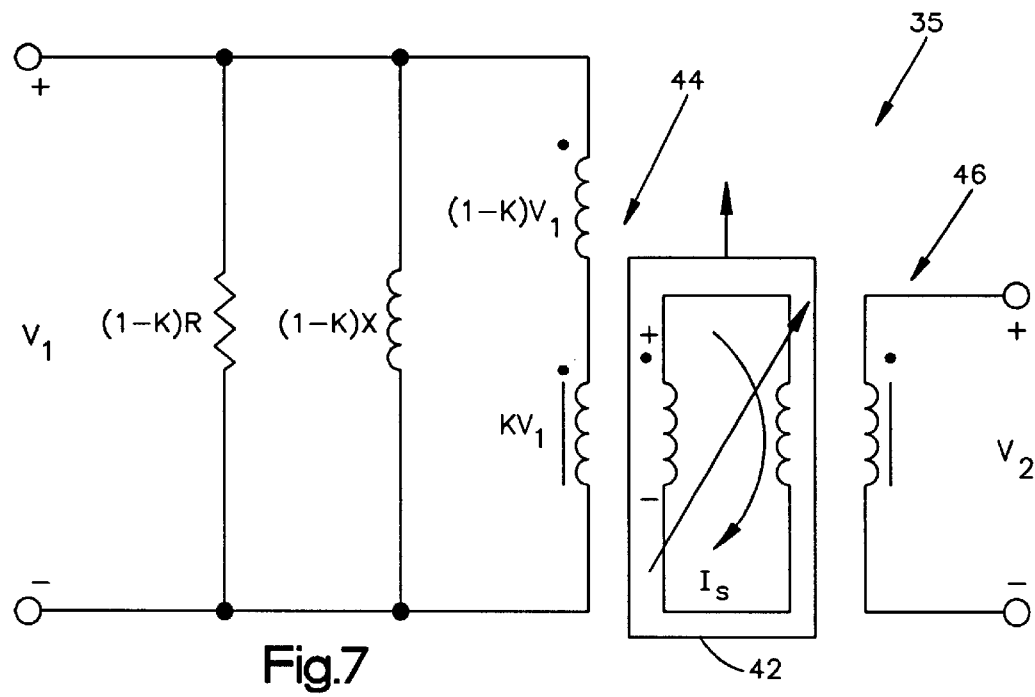
FIG. 7 is a diagram illustrating the equivalent circuit for a sensor probe according to the embodiment in FIGS. 1–6.

With reference to FIG. 6, organization of a control circuit mounted to a printed circuit board 61 carried by the housing 20 will be described. A square wave generator 58 produces a square wave signal on its output line 60. The square wave signal, which operates at 12.8 KHz in the illustrated embodiment, is provided as an input to a sine wave shaper circuit 62 which converts the square wave signal to a low-harmonic distortion sine wave signal having the same frequency which is provided on its output 64. The sine wave signal is amplified by an amplifier and driver circuit 66 and provided at an output 67 to the primary winding 44 of the winding assembly 32. The sine wave signal provided to the primary winding is coupled to the secondary winding in proportion to the relative longitudinal overlap of the winding assembly 32 and the coupling member 42. The signal developed across the secondary winding is provided on an output 68 to a buffer amplifier 70, which provides a high input impedance for and amplifies the relatively small signal developed across the secondary winding. Buffer amplifier 70 additionally includes means for eliminating induced high frequency noise and any DC offset. The output 72 of the buffer amplifier is provided to a precision rectifier 74 which produces a DC analog voltage on its output 76, proportional to the average AC voltage developed across the secondary winding. The DC analog voltage is amplified by a DC amplifier 78 and provided by an output 80 as an input to a ride control computer of the vehicle (not shown).

The output 60 of the square wave generator 58 is additionally provided as an input 81 to a negative power source 82 which produces a voltage on its output 83 which is negative with respect to the vehicle chassis ground and is provided as an additional supply voltage to the precision rectifier 74 and the DC amplifier 78. The purpose of supplying these portions of the control module with a negative voltage, which is normally not available in a vehicle electrical system, in addition to the conventional positive supply voltage, is to improve the linearity of the output signal, especially at low signal levels, while allowing the DC offset of the sensor output to be adjusted to a desired level, which may be zero or even a negative voltage. Additionally, by supplying a voltage to the precision rectifier and the DC amplifier that is negative with respect to chassis ground, means are provided for detecting certain internal failures of these circuit portions by monitoring the polarity of the voltage on the output 80. If the polarity of the output becomes more negative than a predetermined level, an indication is provided to the ride control computer that the position sensor is malfunctioning.

Figure 11:
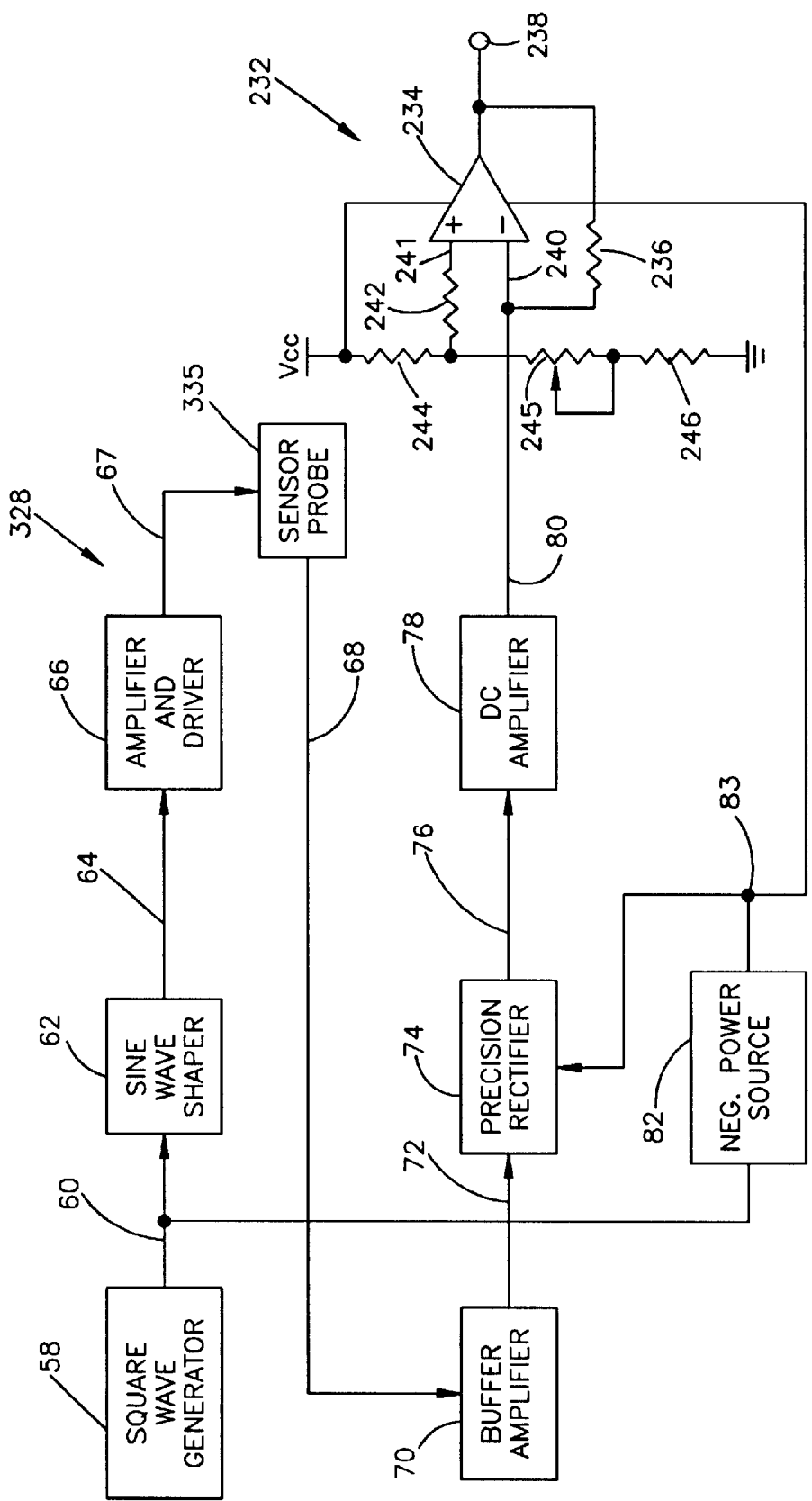
FIG. 11 is an electrical circuit diagram partially in block form and partially in schematic form of the control module of the embodiment illustrated in FIGS. 8–10.

A detailed description of this embodiment of the electrical control system is provided by reference to FIG. 11. The vehicle supply voltage is connected through a connector to an input 85 and is conditioned by an input filter 86 and a reverse polarity protection diode 88. The conditioned supply voltage is regulated to a constant voltage VCC by a voltage regulation means 90, which may be of any such means well-known in the art and is illustrated as a programmable zener diode. The voltage VCC is produced on a bus 92 and is provided as a supply voltage to selected components in the circuit.

A square wave oscillator 58, in the illustrated embodiment, is a type 555 CMOS timer 94 having a frequency established at 12.8 KHz by a capacitor 96 connected between a timing terminal of timer 94 and signal ground and in series connection with resistors 97–100 and VCC bus 92. One of the resistors 100 is adjustable to provide factory adjustment of the frequency of timer 94. As is recognized by one skilled in the art, CMOS timer 94 provides a stable frequency and amplitude source over a wide range of temperature conditions. The output (pin 3) from timer 94 on line 60 is scaled by a pair of precision resistors 101 and 102, connected in a voltage divider arrangement, and provided on line 104. Line 104 is provided as an input 64 to amplifier and driver circuit 66 through a resistor 106. The characteristics of the signal on line 104 are significantly altered by sine wave shaper 62 which is connected between line 104 and ground and serves as an "active load" low-pass filter to shunt the high frequency harmonics of the square wave signal to ground. This allows substantially only the low frequency component of the square wave, which is a sine wave having a frequency equal to the pulse repetition rate of the square wave generator, to pass to the primary winding 44.

Sine wave shaper 62 includes an operational amplifier 108 having a non-inverting input on line 110 held at a constant voltage provided by a voltage divider consisting of resistors 112 and 114 series connected between a positive DC power source V+ and signal ground. Amplifier 108 further includes an inverting input 116 connected with line 104 through a capacitor 118. Amplifier 108 produces an output on a line 120, which is connected with inverting input 116 through a resistor 122 and with line 104 through a capacitor 124. The particular configuration for sine wave shaper 62 causes it to actively shunt higher frequency components of the square wave to ground by the particular feedback arrangement between output line 120 and inverting input 116 including resistor 122 and capacitors 118 and 124, while providing a relatively high impedance to the base frequency of the square wave produced by timer 94 and serving to shape the signal. Accordingly, the resulting signal is a sine wave having a frequency equal to that of the pulse repetition rate of timer 94.

The sine wave signal is provided through a resistor 106 to line 64 as an input to amplifier and driver 66. Amplifier and driver 66 includes an operational amplifier 126 having a non-inverting input 128 provided with a constant voltage level from the voltage divider formed by resistors 112 and 114 and an inverting input 130 connected with input line 64 and provided with the sinusoidal signal previously described. Amplifier 126 includes an output 132 connected directly with the base terminal of a transistor 134 whose collector is connected directly with V+ and whose emitter is connected with a line 136. A feedback resistor 138 connects line 136 with inverting input 130 to establish the combined gain of amplifier 126 and transistor 134 and to cause this combination to operate as a linear amplifier. A resistor 139 between line 136 and signal ground provides a load for amplifier 126 and provides noise suppression of high frequency signals induced from external sources.

Line 136 is connected to a parallel combination of a resistor 140 and a capacitor 142. The purpose of the parallel combination is to reduce the DC component of the signal provided to the primary winding 44 while coupling the AC component of the signal to the primary winding 44. Resistor 140 may be a varistor in order to compensate for the effect of temperature variations of the DC resistance of primary winding 44. The parallel combination of capacitor 142 and resistor 140 are connected through a filter circuit 144 to one terminal of primary winding 44, the other terminal of which is connected to signal ground.

The excitation of primary winding 44, by the previously described circuitry, creates a magnetic flux which is coupled by the transformer coupling member 42 to the secondary winding 46 which will cause a signal to develop across the secondary winding. The secondary winding 46 is connected between line 68 and signal ground. Line 68 is connected to one terminal of a series capacitor 146 in order to couple only the AC components of the signal developed across secondary winding 46 to the remaining portions of the circuit. A second terminal 149 of capacitor 146 is connected to a capacitor 148 which provides a high frequency shunt to ground to reduce high frequency noise induced into the windings 44, 46. Terminal 149 is connected to the input of buffer amplifier 70 through a series combination of a gain-adjusting resistor 150 and a resistor 152.

The buffer amplifier 70 includes an amplifier 156 having an inverting input 154 to receive the signal from resistor 152. Amplifier 156 further has a non-inverting input 158 connected to a constant voltage source, provided by a voltage divider consisting of resistors 160 and 162 connected in series between V+ and signal ground in order to impart a fixed DC bias to the signal. A feedback circuit, consisting of a parallel combination of a resistor 164 and capacitor 166, is connected between output 168 of the amplifier and its inverting input 154. In this configuration, buffer amplifier 70 provides a high input impedance for the low signal level developed across the secondary winding 46 and amplifies the signal. The output of the amplifier 70 is AC coupled by a series capacitor 170 and a resistor 178 to an input 72 of the precision rectifier 74.

The precision rectifier 74 includes an operational amplifier 172 having a non-inverting input 174 connected to ground through a resistor 175. An inverting input 176 is coupled to the signal on the line 72. A diode 180 is provided as a feedback path between an output 182 and input 176 of amplifier 172 and serves to cause amplifier 172 to conduct positive going portions of the AC signal seen at the secondary of the transformer but to not conduct the negative going portions. In addition, output 182 is further connected through a forward biased diode 184 and a resistor 186 to output line 76. Diode 184 is additionally connected to inverting input 176 through a resistor 188. This configuration provides a forward voltage drop that is substantially reduced from that of a conventional rectifier by essentially dividing the forward voltage drop by the open loop gain of amplifier 172. Additionally, this configuration provides exceptional temperature stability through the use of a pair of oppositely poled diodes in the feedback loop.

Line 76 from the precision rectifier 74 is provided to DC amplifier 78, which includes an amplifier 190. Output 76 is connected to the non-inverting input of amplifier 190. An inverting input 192 of amplifier 190 is connected through a series resistor 194 to a voltage divider consisting of resistors 195, 196, 197, and 198 serially connected between VCC and signal ground. Resistor 197 is adjustable and provides means for adjusting the DC offset on the output of amplifier 190, which is provided on line 199. A parallel combination of a resistor 200 and a capacitor 202 is connected as a feedback path between output 199 and inverting input 192 and establishes the gain characteristics of amplifier 190 while providing low pass filtering characteristics to reduce AC ripple on output line 199. Output 199 of DC amplifier 78 is connected through a resistor 204 to output line 80 which is, in turn, connected to an output pin 206 of connector 29. A diode 208 between output line 80 and signal ground provides a reverse voltage clamp to eliminate excessive negative voltage swings that otherwise could be passed to the ride control computer. Additional low pass output filtering is provided by capacitors 209 and 210.

Output 60 of square wave generator 58 is additionally connected to the non-inverting input of an amplifier 212 whose inverting input 214 is maintained at a constant voltage level by a voltage divider comprising resistors 216 and 218 connected in series between VCC and ground. Amplifier 212 provides a low impedance source for providing a cyclically varying signal to a rectifier circuit 82 including series capacitor 220, series diode 222, shunt diode 224, and shunt capacitor 226. The output of rectifier circuit 82 is provided on line 82 as a DC voltage which is negative with respect to signal ground. Negative voltage line 83 is provided as a supply voltage to amplifiers 172 and 190 in addition to the positive voltage supplied to these amplifiers from V+. In this manner, amplifiers 172 and 190 are capable of operating in a linear region even at small signal levels and the DC offset on output line 199 of amplifier 190 may be adjustable to zero and even a negative voltage, if desire. An additional advantage of providing a negative voltage supply to amplifiers 172 and 190 is that an internal failure of either amplifier may result in a negative voltage in output line 199 which could be interpreted by the ride control computer as an indication of a malfunctioning of the control module.

Operation

In operation, a square wave of stable frequency and amplitude is produced by square wave generator 58 on line 60, which includes a low frequency component and harmonically-related higher frequency components, and is scaled by resistors 101 and 102. The scaled square wave is converted to a low-distortion sine wave by the active-load, high frequency shunt action of sine wave shaper 62. Sine wave shaper 62 provides a low-impedance shunt for the higher frequency components and a high-impedance load to the low frequency signal component of the square wave, as well as serves to refine the shape of the resulting signal. Therefore, a low distortion, stable amplitude sine wave is produced. This sine wave signal is amplified by amplifier and driver 66 and is provided to primary winding 44 through resistor 140, capacitor 142, and filter 144.

The excitation of primary winding 44 induces a spirally looping current in tubular conductor 43. In turn, the looping current in the tubular conductor 43 causes a voltage to be induced in the secondary winding 46 that is proportional to the length of the winding assembly distal portion 36 that is telescoped within the tubular conductor 43. Thus, the tubular conductor 43 provides the transformer coupling between the primary and secondary windings. The voltage developed across secondary winding 46 is amplified by buffer amplifier 70 and rectified to a DC level, equal to the average value of the AC signal, by precision rectifier 74. The output of precision rectifier 74 is amplified and further filter by amplifier 78. The gain of the control module may be adjusted by adjusting resistor 150 and the offset of the output signal on pin 206 may be adjusted by adjusting resistor 197.

Figure 12:
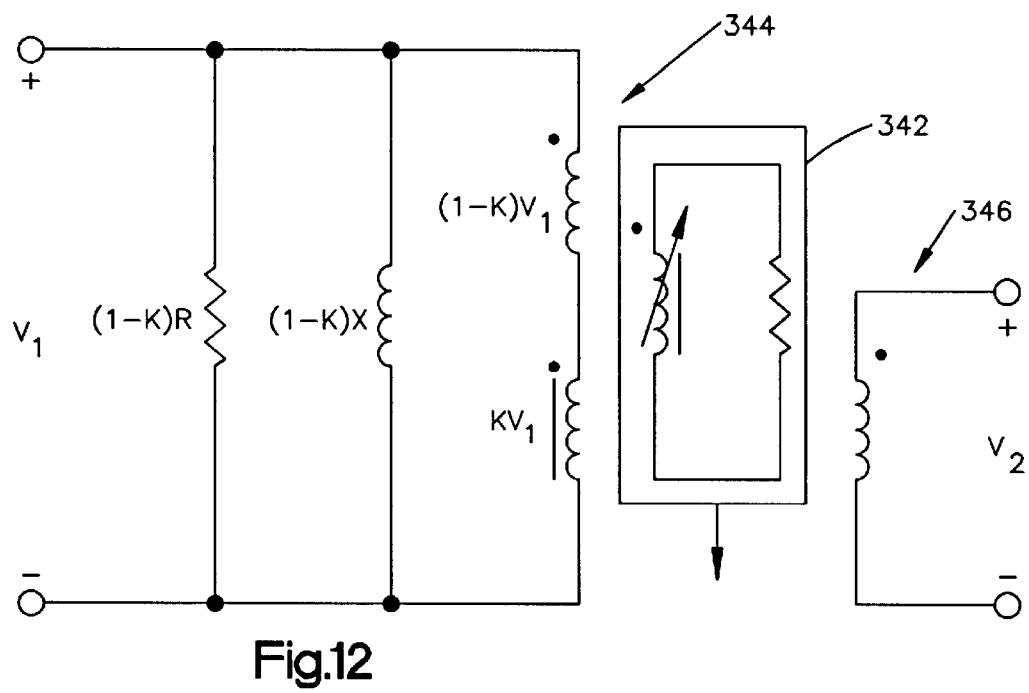
FIG. 12 is a diagram illustrating the equivalent circuit for a sensor probe according to the embodiment in FIGS. 8–10.
Figure 8:
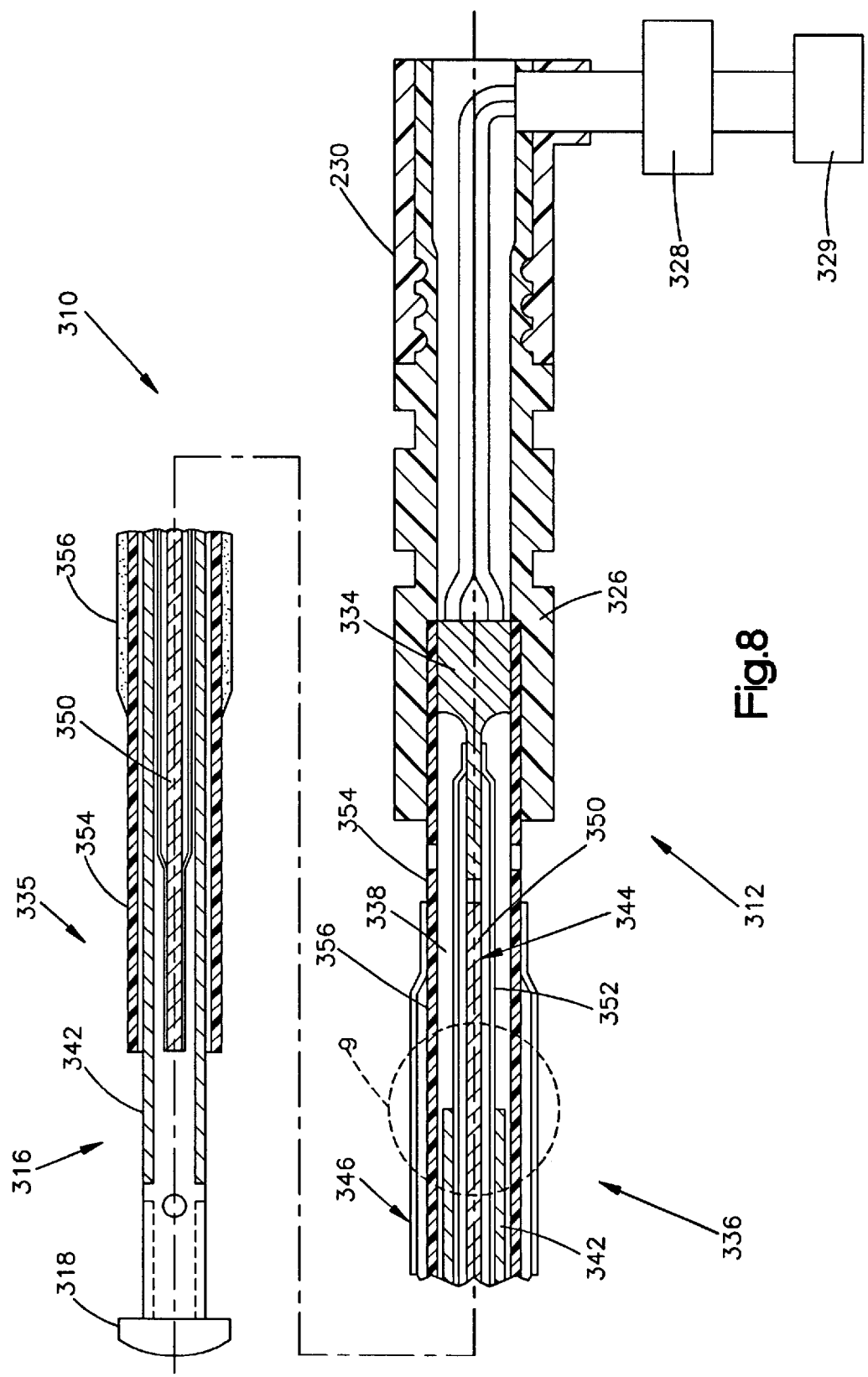
FIG. 8 is a sectional side view of a second embodiment of the invention.

The effect of the tubular conductor 43 of the sensing portion 36 of the winding assembly is illustrated by reference to FIG. 12, in which:

K represents the forward voltage transfer ratio

R is the effective input resistance of the sensor

X is the effective sensor input reactance $V_1$ is the input voltage signal provided to the primary winding 44

$V_2$ is the output voltage signal developed across the secondary winding 46.

$I^s$ is the looping current induced in tubular conductor 43. Windings 44 and 46 are long, slender coils. A current in such a coil causes a magnetic flux that is dense inside the coil and decreases with distance rapidly outside of the coil. Therefore, except for the effect of tubular conductor 43, essentially no signal $V_2$ would be developed across winding 46 in response to the excitation of winding 44 because the windings are side-by-side. As tubular portion 42 overlaps a portion of the winding assembly, the magnetic flux produced by the primary winding links the tube, which induces a looping current in the tube. This induced current produces a flux within the tube, which is opposite to and partially cancels the primary flux. If the counter-flux is, for example 0.3 times the original flux in the primary coil, the flux within the primary coil will be at its original amplitude within the non-overlapped length, but at only 70% of its original amplitude within the overlapping portion. This will reduce both R and X, which will respond as though the overlapped portion of the primary winding were partially shorted, or removed from the circuit.

Since the same length of secondary winding 46 is within the tubular conductor 42, this portion of the secondary winding will experience, in this example, a flux that is 30% of the original flux amplitude in the primary while the non-covered portion of the secondary will experience essentially no flux. $V_2$ is directly proportional to $V_1$ times the ratio of flux in the secondary to the flux produced by the primary. The result is a voltage induced across the secondary that is proportional to the length of the winding assembly that is within the tubular portion 42.

In the preferred design illustrated in FIGS. 1–11 the coupling member is constructed from a conductive tube, preferably aluminum. The winding assembly 32 fits within the confines of the tubular conductor 43 to a greater or lesser extent depending upon the relative positioning of the wheel assembly and vehicle chassis.

Alternative Coupling Embodiment

In accordance with an alternate embodiment of the invention shown in FIGS. 8–12 the primary and secondary windings are positioned one within the other and separated by a cavity, or gap, and a coupling adjustment means includes a coupling disrupter member longitudinally positionable between the windings in the gap. In this embodiment, as the coupling adjustment means and the sensing probe become more telescopingly coextensive, the voltage developed across the secondary winding, as a result of the voltage applied to the primary winding, decreases because the coupling adjustment means inhibits, or reduces, the amount of transformer coupling between the windings.

Figure 16:
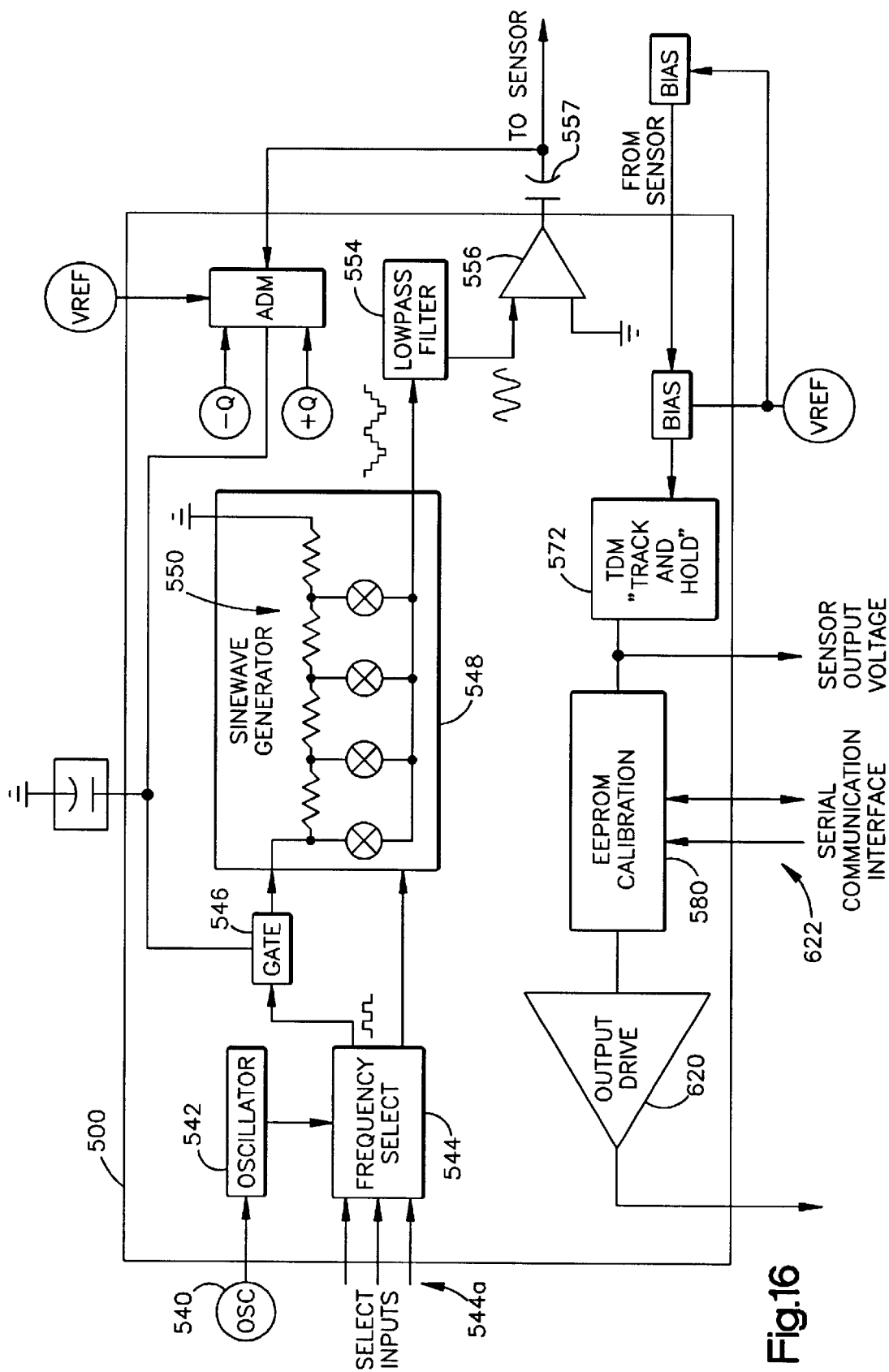
FIG. 16 is a schematic of an electronic control module for use with a position sensing system that uses an electronic calibration system.
Figure 17:
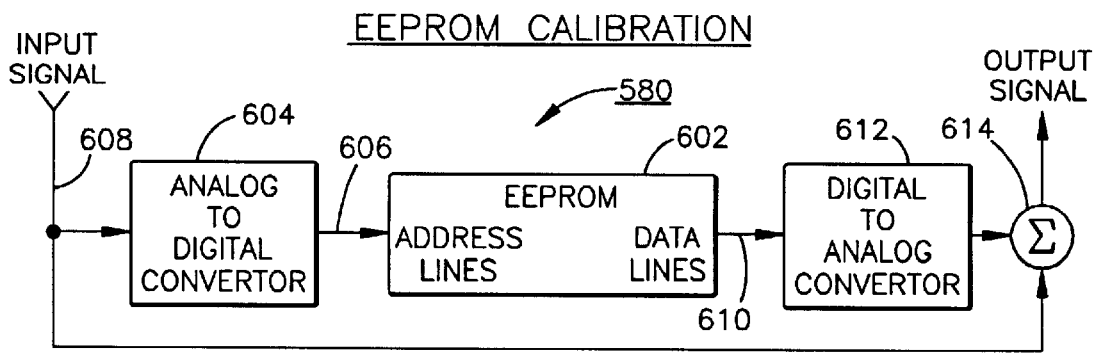
FIGS. 17–21 are schematic depictions of an electronic calibration system constructed in accordance with one embodiment of the invention.
Figure 18:
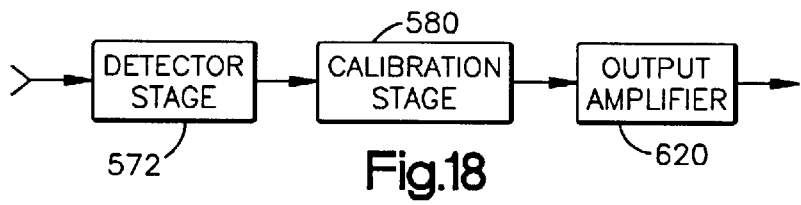

In this embodiment, a non-contact linear position sensor assembly 310 includes a base portion 312 and a tracking portion 316, which are mutually longitudinally telescopingly positionable with respect to each other. Base portion 312 includes attachment means (not shown) for attachment thereof to a stationary portion of the vehicle and tracking portion 316 includes attachment means 318 for attachment to a movable portion of the vehicle, such as a wheel assembly. Base portion 312 includes a sensing portion 336 including a primary winding 344 comprising a coil 352 spirally wound around the axis of the core 350 (FIGS. 16, 17, and 18). Primary winding 344 is seen to be positioned within a secondary winding 346 which includes a core 354 having a wall defining a central bore that has an inner diameter that is substantially larger than the outer diameter of core 350. Secondary winding 346 further includes a coil 356 wound about the axis of the core 354. The dimensions of the primary and secondary windings are selected in order to define a cavity or gap 338 between the primary and secondary windings. A tubular portion 342 of tracking portion 316 is longitudinally positionable within the gap 338. Tubular portion 342 and sensing portion 336 define a sensing probe 335.

Core 350 includes an enlarged end portion 334 which is sized to frictionally engage core 354 which, in turn, is sized to frictionally engage a frame member 326 included in base portion 312 (FIG. 16). Position sensor 310 further includes a stress relief member 230 which engages frame 326 and supports a plurality of electrical leads extending to a control module 328 which, in turn, is connected by an electrical connector 329 to the ride control computer (not shown).

Core 350 is made from a ferromagnetic material, such as iron, and the secondary core 354 is made from a non-magnetic material, such as a structural polymer. As best seen in FIG. 16, the primary and secondary coils do not extend the entire length of their respective cores. Rather, the coils are positioned on their respective cores in a manner that will provide interface between the coupling means and the coils over the entire extent of travel of tubular portion 342, plus an additional length of the core equal to approximately 10 percent of the inner primary coil and 5 percent of the outer secondary coil. Primary and secondary windings are each spirally wound around their respective cores from a single length of wire and are each covered by a protective film such as a Mylar sleeve or other insulating material.

Figure 20:
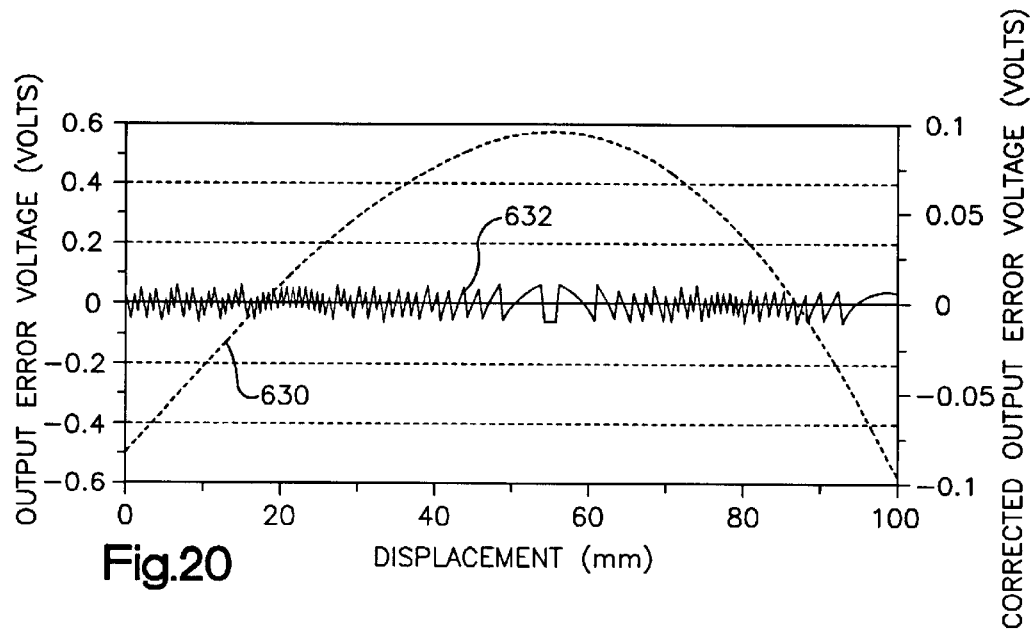

Because primary winding 344 is positioned within secondary units 346, excitation of the primary winding by a voltage $V_1$ induces a voltage $V_2$ in the secondary winding (FIG. 20). The coupling adjustment member in this embodiment, which is defined by tubular portion 342, operates as a magnetic shield which interrupts this transformer coupling between primary winding 344 and secondary winding 346. Tubular portion 342 creates a variable reluctance path for the magnetic flux. This variable reluctance path proportionately decreases the amount of current induced into the secondary winding. The flux available for inducing a voltage in the secondary winding is proportional to the length of gap 338 in which the tubular portion 342 is absent. Accordingly, as tubular portion 342 is additionally telescopingly extended within gap 338, the magnetic shielding effect of the tubular portion reduces the magnetic coupling between the windings, which reduces the voltage developed across the secondary winding from the signal applied to the primary winding. Therefore, the output signal from the sensing probe responds to the relative positioning of the position sensor portions in the opposite manner to that described in the embodiment illustrated in FIGS. 1–10. In the illustrated embodiment, tubular portion 342 is made from a magnetic metal such as iron. However, nonferrous and even nonmagnetic materials can be used so long as the tubing has an effect on the transformer coupling.

Figure 5:
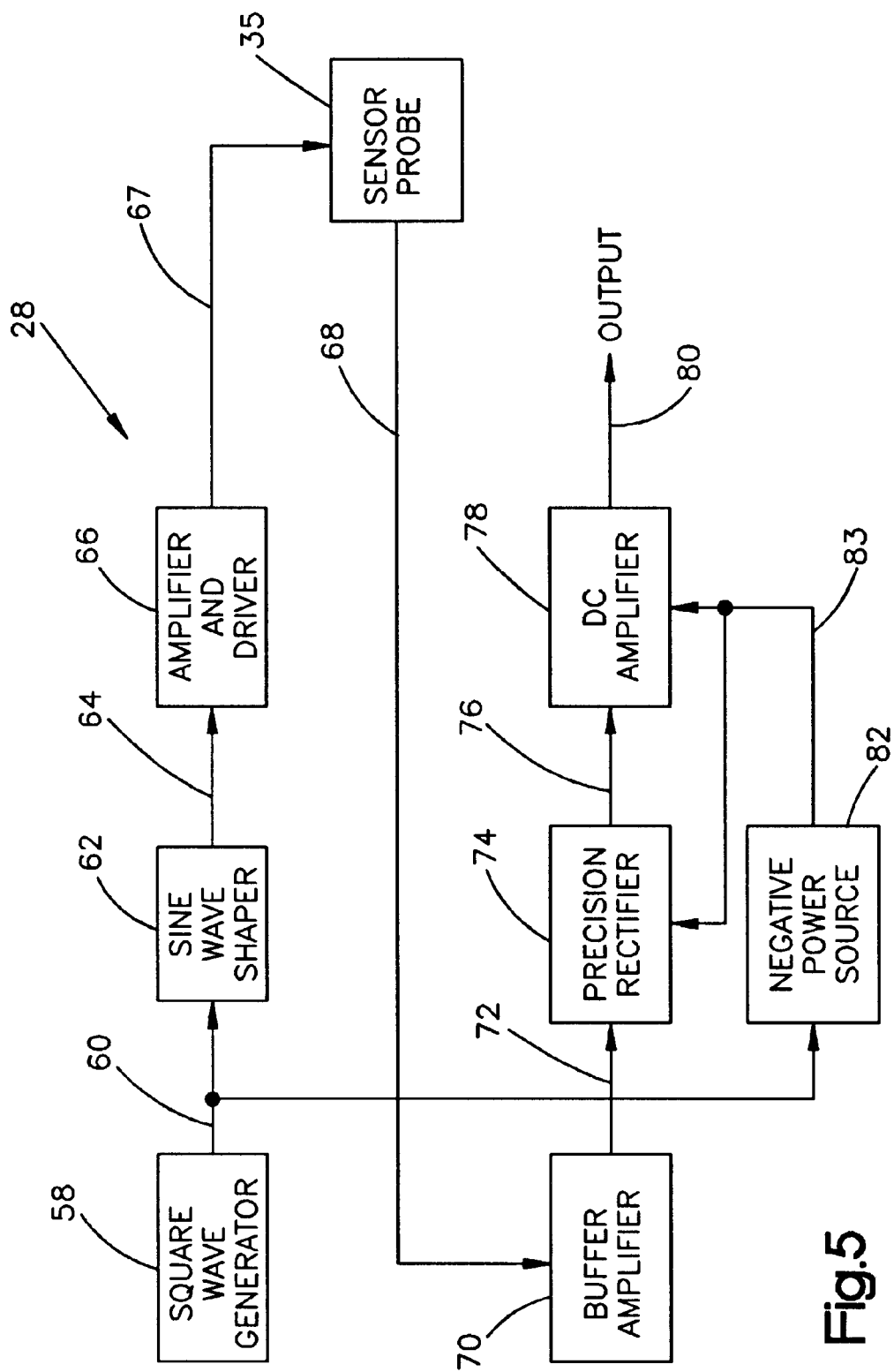
FIG. 5 is an electrical circuit diagram in block form of the electrical control circuit of the invention.

The control module 328, provided with this embodiment, as illustrated in FIG. 11, is essentially the same as that disclosed in FIGS. 4 and 5, with the addition of an inverting amplifier 232 connected with the output 80 of DC amplifier 78. Inverting amplifier 232 includes an operational amplifier 234 having a feedback resistor 236 extending between an output 238 of the amplifier and an inverting input 240, in order to establish its gain. The non-inverting input 241 of amplifier 232 is provided with a constant voltage level through a voltage divider, comprising resistors 244, 245, and 246 series connected between VCC and ground, and a series resistor 242. In the embodiment illustrated in FIG. 11, resistor 245 is adjustable. Amplifier 234 is supplied with both a positive voltage V+ and a negative voltage, the latter from line 83.

Second Alternative Embodiment

An additional embodiment of the invention adapted for use with a vehicle ride control system is illustrated in FIGS. 13 and 14. This embodiment has the same electrical configuration and operates in the same manner as the embodiment illustrated in FIGS. 1–7 with the principal exception that the length of the primary and secondary winding is reduced to 4.8 inches in the illustrated embodiment.

A linear position sensor assembly generally illustrated at 410 includes a base portion 412 attached by an attachment member 414 to one portion of a vehicle, such as the vehicle chassis, and a tracking portion 416 which is attached to the portion of the vehicle whose position it is desired to sense, such as a wheel support assembly by a second attachment member 418 (FIG. 13). Tracking and base portions 416 and 412 are relatively longitudinally movable with respect to each other and are flexibly closed by a longitudinally flexible boot 420. The boot 420 includes a first end 422 sealingly engaged with base portion 412 by any suitable clamping means, such as a cable tie 500 and a second end 424 sealingly engaged with tracking portion 416 by any suitable clamping means, such as a cable tie (not shown).

Base portion 412 includes a frame 426 and a control module 28 incorporated within frame 426 in a common package such as by encapsulation with a suitable encapsulating material that is resistant to various automotive fluids. An electrical connector 429 adapted to engage a mating connector (not shown) for connection to the ride control computer provides input and output interconnection for control module 28. Frame 426 includes an inner surface 427 defining an internal circular chamber 430 in which a winding assembly 432 is firmly positioned. Winding assembly 432 includes primary and secondary windings 444 and 446 that are enclosed by a structural polymer shell 448 and has an end portion 434 dimensioned to frictionally engage surface 427. Winding assembly 432 further has a sensing portion 436 spaced from surface 427 to define an annular cavity or gap 438 therebetween. Tracking portion 416 includes an end portion 440 to which attachment member 418 is affixed and coupling adjustment means comprising an elongated tubular portion 442.

Tubular portion 442 is configured to freely slide within gap 438 between sensing portion 436 of the winding assembly 432 and surface 427. Tubular portion 442 includes a nonferrous metal transformer coupling member 495 tightly fitted within a polymeric support tube 496. A plurality of ribs 497 are annularly spaced around the outer surface of tube 496 and provide low friction guide means for slidable engagement with surface 427 (FIG. 13). A plurality of openings 498 extend through a wall portion of frame 426 and provide air flow means for equalizing the pressure within gap 438 as tubular portion 442 longitudinally moves therein.

Representative values of various components in the illustrated embodiment of the circuit of FIGS. 10 and 11 are disclosed in U.S. Pat. No. 5,216,364 which is incorporated herein.

Figure 21:
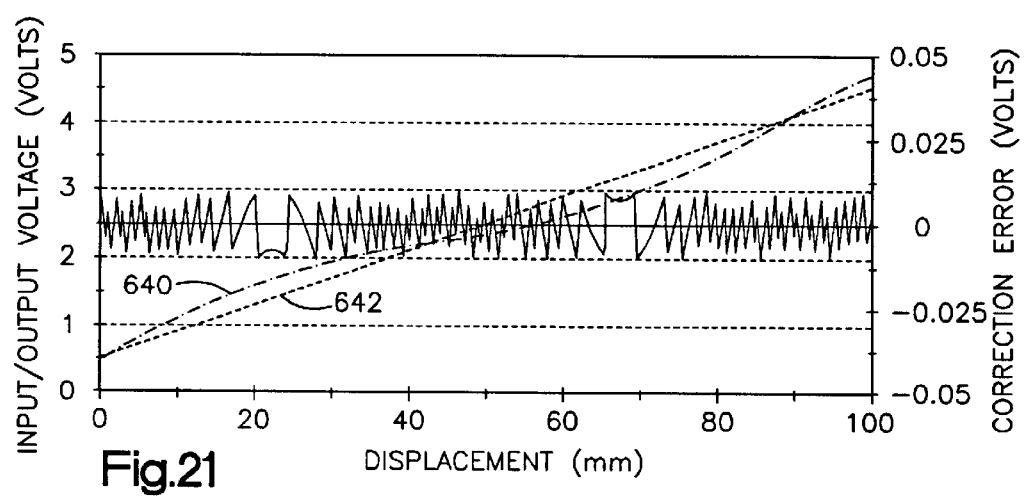

The present invention is readily adaptable to low cost automated assembly. The windings may be spirally positioned on the respective cores merely by rotating of the cores while applying the wire turns by a numerically controlled apparatus. The output characteristics of the sensor assembly, with respect to the relative positioning of the sensor probe portions, may be adjusted by selectively adjusting the turn-spacing of the coils along various portions of the respective cores as shown in FIG. 21. This versatility allows the position sensor to be "tuned" to the characteristics of a particular vehicle's suspension system. The ability to combine the packaging of the sensing probe and electronic module allows adjustment to the electronic circuitry, such as gain and offset, to be made at the factory before the components are encapsulated. Thereafter, the position sensor assembly may be easily positioned on the vehicle and connected to the ride control computer without additional adjustment in the field. The structure of the various components additionally reduces weight and bulk and enhances the durability of the assembly. The unique aspects of the control module according to the invention provides a reduced component count which further improves the compactness of the assembly and, along with the superior temperature stability of the circuit, allows an entire sensor probe to be positioned within a harsh environment. Furthermore, the components of the sensor probe can be adapted for a lubricous sliding interfit provided by a hydraulic fluid of a shock absorber in which the sensor can be located with no effect on sensor performance.

A linear position sensor assembly according to the invention may be made responsive over 90 percent of the stroke length of the tracking portion with respect to the base portion. Thus, space occupied by the assembly is substantially reduced. In addition to positioning within a shock absorber, the invention may be adapted to mounting external to a shock absorber parallel to the direction of its travel. The invention may additionally find application in sensing the position of portions of an automotive vehicle other than the suspension system and may be applied to non-vehicular uses such as use with machine tools and the like.

The linear postion sensor provides an output voltage that is proportional to the mechanical displacement length of the sensor. When the sensor is in the fully compressed state, the output voltage will be at a designated level. Conversely, when the sensor is in the fully extended state, the output voltage will also be at another designated level. In the preferred embodiment the output voltage response of the sensor is desired to be linear through the range of full compression to full extension. In alternate embodiments the output voltage versus displacement could have any relationship.

The results obtained by the alternate embodiments described thus far are illustrated in FIG. 4. By reference to this figure, it is seen that the signal developed acress the secondary winding, which is directly proportional to the voltage transfer ratio, is substantially linearly related to the amoutn of overlap of the tubular portion 42 with respect to sensing portion 36 of the winding assembly. Furthermore, an important feature of the presnet invention is that the radially wound coils may be wound with a pre-established non-constant turn spacing, by a commercially availiable numerically controlled winding apparatus, in a manner that may substantially cancel any remaining nonlinearity and is within the capabilities of one skilled in the art. Alternatively, it may be desired to provide a particular characteristic nonlinear voltage trasfer ratio for a particular application. The turn spacing may be arranged in order to "tune" the voltage transfer ratio to the desired characteristic.

To achieve the desired output signal linearity, full compression output voltage and full extension output voltage, there must be effort directed toward developing a specific winding profile of the wire coils placed on the sensor element. The winding profile provides variations of the turns-density of the coil placed on the sensor element's magnetically permeable core. The profile compensates for nonlinear variations in the response of the sensor element. Effort must also be directed in calibrating the output signal's absolute voltage with respect to battery ground. This is accomplished by changing the gain and offset of an output amplifier state. In doing so, the output voltage response can be positioned where specification requirements dictate.

Electronic Calibration

FIGS. 16–21 illustrate a technique for calibrating a sensor system for use an elongated position sensor 10. FIG. 16 illustrates an integrated circuit 500 that is described in more detail in issued U.S. Pat. No. 5,369,375 which issued from the United States Patent and Trademark Office on Nov. 29, 1994 and whose subject matter is incorporated herein by reference.

The circuit 500 illustrated in FIG. 16 is shown coupled to an oscillator circuit 540 which feeds a periodic waveform to an oscillator 542 within the circuit 500 to provide a clock signal. The clock signal is passed to a frequency select state 544 which generates a second clock signal based on frequency select inputs 544a. A divide-down counter controlled by the frequency select inputs 544a ouputs a unipolar square wave having a frequency that is a fraction of the output frequency of the oscillator 542.

A gate 546 is controlled by the second clock signal and gates a sinewave generator 548 to produce a unipolar approximation of a sinewave at the selected frequency. The sinewave generator 548 uses the clock signal to consecutively gate steps on a voltage divider resistor ladder 550. The voltages at the steps on the resistor ladder 550 are set to enable signal generation at the desired frequency, ie. a sinewave approximation at the selected frequency. The sinewave approximation is actually a stepped curve having thrity-two steps per period. The output from the sinewave generator 550 is coupled to a lowpass filter 554 which smooths the stepped signal and then provides an output to a linear amplifier 556 and capacitor 557.

A return signal from the sensor is coupled to a track and hold circuit 572 and then to an EEPROM calibration circuit 580 which provides an output to a drive circuit 582 to a circuit output 584. A serial communications interface 586 is used to program the EEPROM calibration circuit 580.

A system using the electronic calibration circuit 580 provides automatic calibration to the output from the circuit exhibiting either linear or non-linear characteristics. By connecting the circuit 500 to external circuity for reprogramming the EEPROM circuit, the system 1 can be reprogrammed if needed to adjust the calibration of the system or of the sensor 10. Thus the system could be reprogrammed to exhibit different ride characteristics when used in the automatic ride control system of FIG. 1A.

Figure 19:
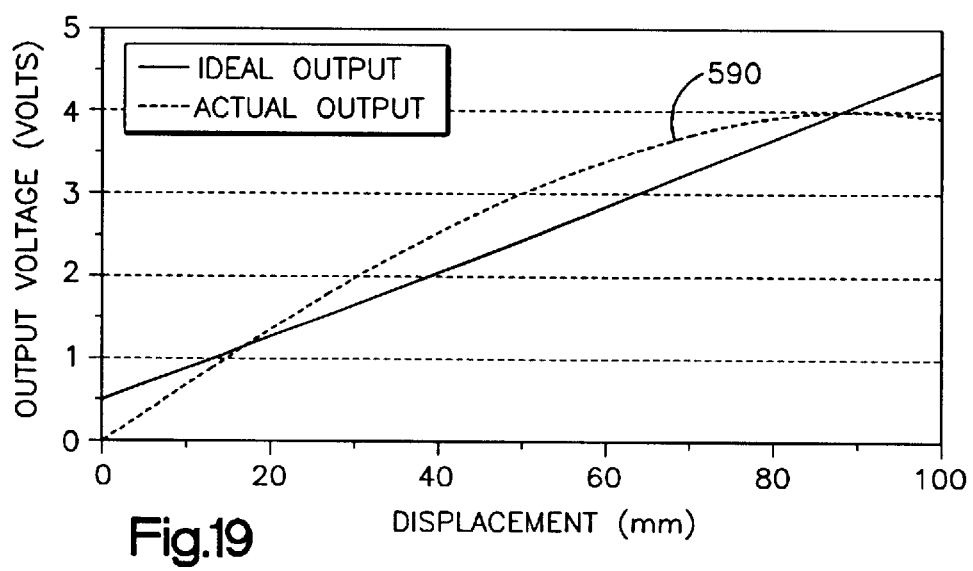

As seen in the graph of FIG. 19 a Linear Position Sensor 10 provides an output voltage 590 that is proportional to the mechanical displacement length of the sensor. When the sensor 10 is in the fully compressed state the output voltage will be at a designated level. Conversely, when the sensor 10 is in the fully extended state, the output voltage will also be at a designated level. Between the two states the voltage is generally increasing but in a non-linear fashion. A plot of displacement version deviation (in volts) from a linear relation is illustrated in FIG. 20.

In accordance with one embodiment of the invention, it is desired to provide a modified voltage output from the sensor 10 that is linear through the range of full compression to full extension between the compressed and extended state.

To achieve the desired output signal linearity between full compression output voltage and full extension output voltage, one version of the sensor requires a specific winding profile of the wire coils placed on the sensor element. The winding profile provides variations of the turns-density of the coil placed on the sensor element's magnetically permeable core. The profile compensates for non-linear variations in the response of the sensor element. Effort must also be directed in calibrating the output signal's absolute voltage. This is accomplished by changing the gain and offset of an output amplifier stage. In doing so, the output voltage response can be positioned where specification requirements dictate.

In an effort to reduce or eliminate calibration through the use of winding profiles and gain and offset control, a calibration stage 600 employing an EEPROM memory 602 is used. The EEPROM calibration 580 could include an analog to digital (A/D) converter 604. A digital output 606 of the A/D converter 604 could then be connected to the address lines of an EEPROM circuit 602. As the sensor input changes from a generally low voltage level to a generally high voltage level in a monotonic fashion, the A/D converter 604 will convert the analog input signal 608 into an eight bit digital representation and will control the address lines of the EEPROM. As the address lines change from a generally low memory location to a generally high memory location, each data cell location referenced by the address lines will become active. Each address will have an associated data cell. The data cells will contain a digital representation of a correction factor for each address referenced by the A/D converter. The correction factor for each particular address will be presented, in digital form, to the data lines 610 of the EEPROM. This digital number will then be connected to a digital to analog (D/A) converter 612. The D/A converter will transform the digital representation of the correction factor into an analog voltage 614. This voltage will be added to, or subtracted from, the actual sensor output voltage 608 by a summing circuit 616 resulting in a linearized, gain and offset corrected, sensor signal. The resultant signal can be connected to a buffer element to prepare the signal for connection to external devices.

If the sensor displacement was divided into discrete sections, 256 for example, and a byte of EEPROM was allocated for each section, the voltage response of each section could be controlled to a precise level. Each byte would consist of eight bits. Each bit will represent a specific voltage offset from whatever voltage is presented to the calibration stage. The voltage offset that each bit represents could either be predefined or programmable. The calibration stage has the ability to change the incoming voltage with either a positive offset or a negative offset. Therefore, with a count of 256 available offset steps, the middle (128) would represent zero offset. As an example, if the incoming voltage was 2.4 Volts, and each offset step represented 20 mV, to offset the signal to a desired 2.5 level the offset count would be incremented by (2.5V−2.4V)/20 mV, or 5 counts. This would mean that the default 128 count would increase by 5 counts resulting in a count of 133. This value would then be stored in EEPROM or other non-volatile memroy.

In practice the correction factor would be programmed into the EEPROM through a serial communications interface 622. For each discrete section in the displacement of the sensor, a number representing that section's correction factor would be loaded into that particular data location. In an alternate embodiment, the EEPROM could be programmed with the digital representation of the desired output voltage instead of a correction factor which then must be summed to the sensor's output signal. FIG. 20 displays output voltage 630 as a function of displacement and also displays corrected output error voltagge 632. FIG. 21 displays voltage 640 input to the EEPROM correction circuit and corrected output voltage 642 from the EEPROM.

Other changes and modifications in the specifically described embodiments can be carried out without departing from the principles of the invention which is intended to be limited only by the spirit or scope of the appended claims.

What is claimed is:

1. For use with a motor vehicle having a pressurized height adjusting member having first and second separable components, a linear position sensor for monitoring relative displacement between first and second separable components comprising:

a) an elongated field producing member having an input for energizing the field producing member to produce an electromagnetic field in the vicinity of the field producing member;

b) an elongated field responsive member oriented generally parallel to the field producing member along a length of the field producing member, and having an output for providing an analog output signal in response to the electromagnetic field produced by the field producing member;

c) a coupling member supported by one of said relatively movable members for relative movement with respect to at least one of the elongated field producing or field responsive members to alter a response of the field responsive member as the coupling member moves and thereby change the analog signal at the output of the field responsive member;

d) a signal source coupled to the input for energizing the field producing member;

e) a monitoring circuit coupled to the analog output from the field responsive member to digitally store and calculate a digitally modified position signal in response to movement of the coupling member; said monitoring circuit including a programmable controller having an electronically programmable memory for digitally modifying the output signal from the field responsive member to provide the digitally modified position signal through a full range of relative displacement between the first and second separable components, and having a controlled relation to displacement of the coupling member; and f) a pressure sensor for monitoring a pressure of a fluid coupled to such height adjusting member.

2. The apparatus of claim 1 wherein the controlled relation is a linear relation between the digitally modified position signal and displacement of the coupling member.

3. The apparatus of claim 2 wherein the field producing and field responsive members are fixed to a common support for relative movement with respect to the coupling member.

4. The apparatus of claim 1 wherein the programmable memory comprises an electronically erasable read only memory.

5. In a motor vehicle having a pressurized height adjustment control member, a method of monitoring separation between first and second relatively movable vehicle components and determining whether such height adjustment control member has failed comprising the steps of:

a) connecting elongated primary and secondary transformer windings to a first of the vehicle components in a spaced relation to each other such that they extend along a tracking path;

b) connecting a coupling member to a second of the moveable components for movement along the tracking path relative to at least one of the primary and secondary transformer windings;

c) energizing the transformer primary winding with an external energy source;

d) monitoring an analog output signal from the secondary winding as the coupling member moves along the tracking path;

e) coupling the analog output signal from the secondary winding to a programmable controller having an electronically programmable memory that produces a digitally modified analog position signal based on the analog output signal through a full range of the coupling member movement to provide a predetermined relation of relative separation of the first and second relatively movable components with respect to the digitally modified analog position signal; and f) monitoring a pressure of the of the control member to determine whether the combination of the position signal and the pressure indicate a failure in the control member.

6. The method of claim 5 wherein the first and second movable components form part of a motor vehicle shock absorber so that the output signal from the transformer secondary provides a ride height signal and wherein a pressure of the shock absorber is monitored and used to determine whether the combination of the height signal and pressure indicate a failure in the shock absorber.

7. The method of claim 6 additionally comprising the step of adjusting the ride level of a motor vehicle based upon the ride height signal and the pressure signal to adjust vehicle handling based upon loading of the vehicle.

8. The method of claim 7 wherein the ride level of the motor vehicle is adjusted by routing pressurized fluid to the vehicle shock absorber.

9. The method of claim 5 wherein the step of modifying the output signal from the position sensor is performed by a programmable controller coupled to an electronically erasable read only memory for providing control over the modification of the output from the winding secondary.

10. For use with a motor vehicle having a pressurized height adjusting member having first and second separable components, a linear position sensor for monitoring relative displacement between the first and second separable components comprising:

a) an elongated sensor connected to a first of the separable components having a field producing member coupled to a sensor input for producing an electromagnetic field in the vicinity of the elongated sensor and providing a sensor output analog signal;

b) a coupling member supported by one of said relatively movable members for relative movement with respect to the elongated sensor to alter the analog output signal from the elongated sensor as the coupling member moves;

c) a signal source coupled to the sensor input for energizing the field producing member;

d) a monitoring circuit coupled to the sensor analog output for digitally calculating a digitally modified analog position signal with relative movement of the coupling member; said monitoring circuit including a programmable controller having an electronically programmable memory for digitally modifying the analog output signal from the field responsive member to provide the digitally modified position signal through a full range of the relative displacement between the first and second separable components, and having a controlled relation based on the relative movement of the coupling member with respect to the elongated sensor;

e) a pressure sensor for monitoring a pressure of a fluid coupled to the height adjusting member; and f) a vehicle ride height controller coupled to the pressure sensor and monitoring circuit for controlling pressure routed to the height adjustment member.

11. The apparatus of claim 10 wherein the vehicle ride height controller comprises means for determining whether the combination of the height signal from the monitoring circuit and a pressure signal from the pressure sensor indicate a failure in the pressurized height adjustment member.

* * * * *